(No Model.)
T. H. HICKS.
SYSTEM OF ELECTRICAL CONVERSION AND DISTRIBUTION.
No. 520,050.     Patented May 22, 1894.
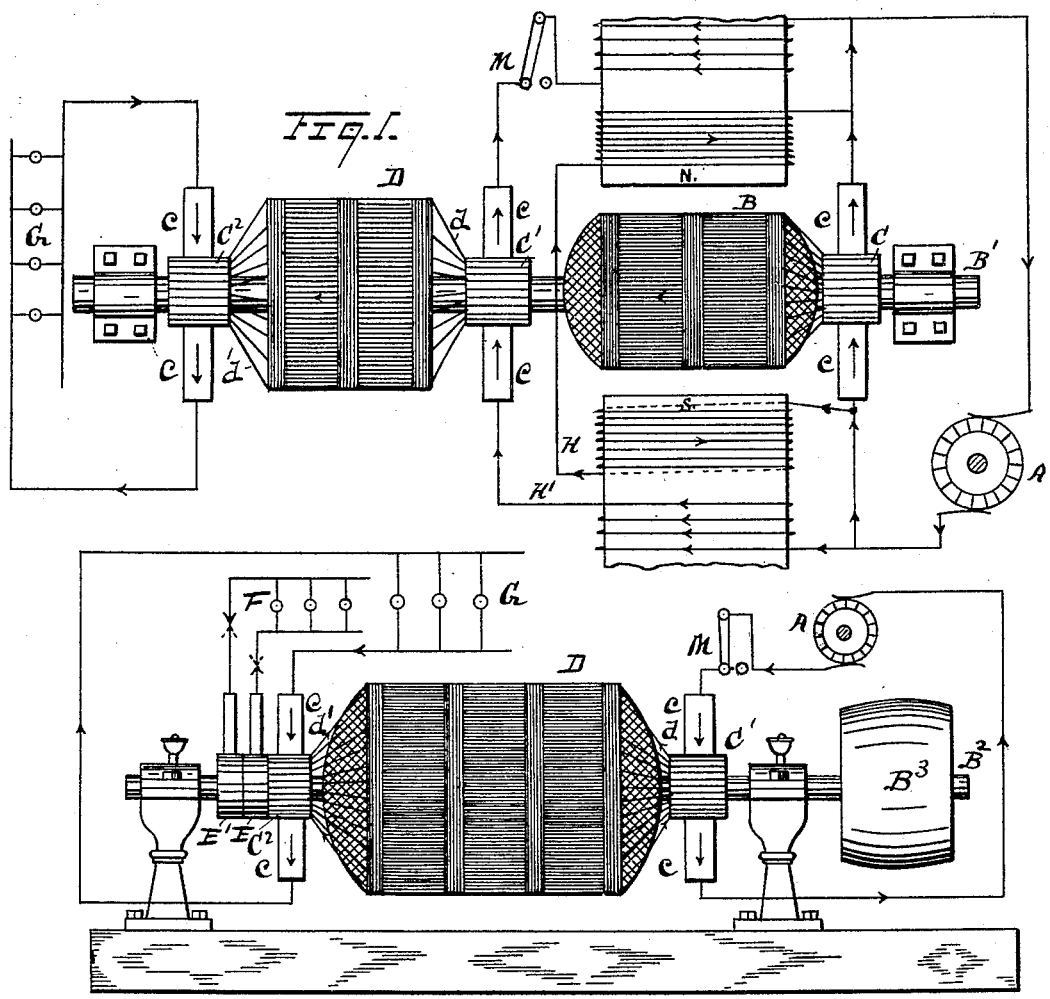
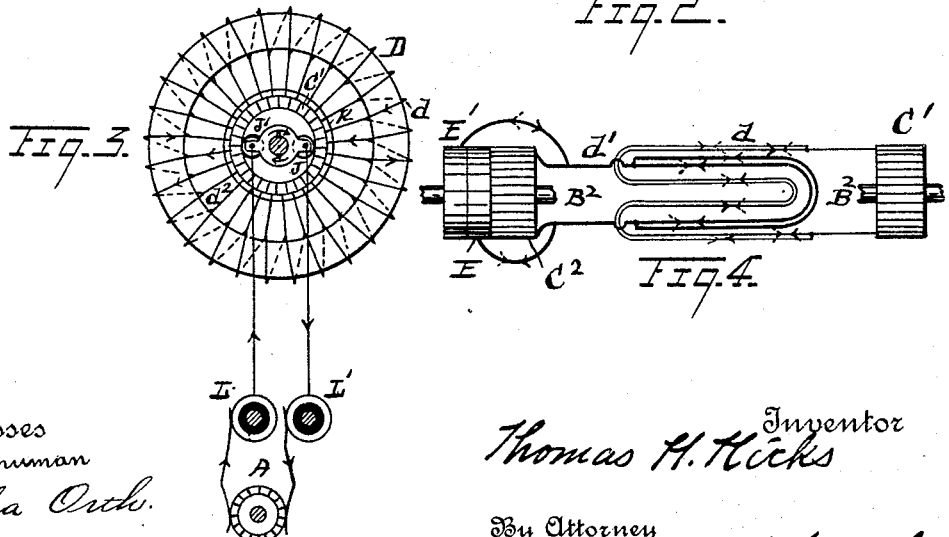
Witnesses
John Schuman
Bertha Orth
Inventor
Thomas H. Hicks
By Attorney
Newell S. Wright

UNITED STATES PATENT OFFICE.

THOMAS H. HICKS, OF DETROIT, MICHIGAN.

SYSTEM OF ELECTRICAL CONVERSION AND DISTRIBUTION.

SPECIFICATION forming part of Letters Patent No. 520,050, dated May 22, 1894.

Application filed December 15, 1892. Serial No. 455,225. (No model.)

*To all whom it may concern:*

Be it known that I, THOMAS H. HICKS, a subject of the Queen of Great Britain, residing at Detroit, county of Wayne, State of Michigan, have invented a certain new and useful Improvement in Systems of Electrical Conversion and Distribution; and I declare the following to be a full, clear, and exact description of the invention, such as will enable others skilled in the art to which it appertains to make and use the same, reference being had to the accompanying drawings, which form a part of this specification.

My present invention relates to a system of electric conversion and distribution, and has for its object more particularly to convert a high potential continuous current into one of lower potential, although I would have it also understood that a lower potential continuous current may be, within the scope of my invention, converted to one of higher potential, but the use of such a current would be very limited.

It is well understood that electricity can not be economically transmitted to any considerable distance unless under considerable electrical pressure, and a pressure suitable for economical distribution is impracticable for ordinary commercial uses. My invention, however, is designed to transmit a continuous current of high potential and convert it to one of lower potential as successfully as a high potential alternating current can be converted to one of lower potential, and with the additional advantage that I can reproduce continuous and alternating currents of low potential, and that too, without requiring a motor or a converter to rotate synchronously with the dynamo supplying the converter.

I carry out my invention as hereinafter described and claimed, and illustrated in the accompanying drawings, in which—

Figure 1, is a plan and diagram view showing a converter rotated by a motor, and the field magnets of the motor wound with supplemental windings in circuit with one of the converter windings. Fig. 2, is a side elevation and diagram view illustrating a modification of my invention wherein a converter is rotated in any convenient manner and showing a continuous and alternating work circuit. Fig. 3, is an end view of the converter in which the converter is stationary and the sliding contacts are rotatable within the commutator. Fig. 4, is a diagram view of the primary and secondary circuits of the converter illustrated in the other figures.

In Figs. 1, 2, and 3, A, represents a high tension continuous current dynamo located at a main station. The balance of the devices illustrated in Figs. 1, 2, and 3, except the work circuits, is intended to be located at a sub-station.

In Fig. 1, B represents a motor of any desired construction. B' is its shaft.

N, S, represent the field magnets which are wound, in addition to the magnet exciting coil H, with supplementary coils H'. Located upon said shaft as represented in Fig. 1, are three commutators, marked respectively C, C', C², each commutator having in combination brushes "c." The commutator C, is in circuit with an armature winding of the motor.

D, represents a converter located upon the shaft B', as shown in Fig. 1. This converter is wound with two separate windings indicated in diagram more particularly, in Fig. 4, "d" representing the primary winding, and "d'" the secondary winding. The primary winding of said converter terminates in the commutator C', the secondary winding terminating in the commutator C².

In Figs. 2 and 4 the secondary converter windings are shown also to terminate in additional rings E, E', which are intended to supply an alternating current work circuit, shown in Fig. 2 at F. The commutator C² supplies the continuous current work circuit G.

The construction of the converter D, may vary in form. As shown in Fig. 1, the iron core and either of the windings taken separately are similar to the well known Gramme rings. The form of this converter is shown more clearly in end elevation in Fig. 3. The two circuits on the converter differ only in point of resistance. The manner of winding the two circuits are alike. The form of either winding may be seen by reference to Figs. 3 and 4. It will be seen that both the primary and secondary circuits are symmetrically wound, so that the current has two paths to travel in each circuit. The arrows in Figs. 3 and 4 indicate the two circuits. It will further be noticed that branch wires "$d^2$" join sections of either winding with a commutator more particularly shown in Fig. 3. In Fig. 2 the converter is shown similar to a drum armature, having two circuits similar to Fig. 1. The converter in this figure is mounted upon a shaft $B^2$, provided with a driving pulley $B^3$.

In Fig. 1, the converter is rotated by a motor, the converter being shown on a motor shaft, while in Fig. 2 the converter may be driven either by a motor or other source of power. When a motor is used for driving, the motor and field magnets of the motor are wound so as to be operative in maintaining constant potential in the work circuit by the supplemental winding already referred to.

It is not absolutely necessary to rotate the converter in order that the spirit of my invention shall be carried out, for in Fig. 3, I illustrate similar results to those embodied in Figs. 1 and 2, by rotating the sliding contacts or wheels J, J' within the commutator C'. Of course the sliding contacts or wheels may be rotated upon the outside of the commutator, but in that case the centrifugal action would tend to throw the sliding contacts away from the commutator during rotation.

K in Fig. 3 represents a metallic band surrounding the commutator and insulated therefrom to resist the outward strain of the sliding contacts J, J' within the commutator. When I use a construction similar to that illustrated in Fig. 3, I require additional rings L, L', to convey a main line current to the sliding contacts J, J'.

M denotes a cut out switch located in the main line high tension circuit.

I will now explain the operation of the device, which is as follows: Referring first to Fig. 1, the high potential continuous current from the source A, supplies the motor B. When the motor has attained sufficient speed, this same current is thrown in circuit with the primary winding of the converter by the switch M. In place of the switch M, a resistance may be used to gradually let the current on the primary converter circuit. The commutator C', serves to change the direction of current through the primary winding in a gradual manner, similar to a motor. When the converter makes a half revolution, the current will have reversed its direction in the winding which is equivalent to alternating the current in a stationary converter. When the current is turned on the primary circuit of the converter, the reversal of direction of current sets up a counter-electro-motive-force, which is induced, as a current of electricity into the secondary circuit; the latter having a commutator $C^2$ in all respects similar to the commutator C'. As this commutator $C^2$ rotates, its rotation supplies its brushes and the work circuit G, with a continuous current in a similar manner to a continuous current dynamo. But by terminating the windings of this secondary circuit in the rings E, E', an alternating current will be given off as shown in Fig. 2. In Fig. 2 is shown both commutator and rings supplying two work circuits, the circuit F with an alternating current, and the circuit G with a continuous current of one direction. The supplemental coils H', which are wound upon the motor field cores, assist in maintaining constant potential during variations of output in the induction work-circuits, as I shall explain in the following manner: If current be sent through the primary coils of the converter and the latter be made to rotate, induced currents will then be manifest in the secondary coils of the converter. The electro-motive force of these induced currents will increase with the speed of the converter up to a certain limit. Either above or below this limit of speed the electric pressure will fall. It falls when below this limit of speed because the reversals in direction of current through the primary converter windings are not sufficiently frequent to prevent the primary current from flowing through the converter when no work is being done in the work circuit, and the pressure falls when above the limit of speed because the efficiency of the converter then diminishes. The highest efficiency is obtained in a converter when the least possible length of primary conductor is used, and the length of said conductor can be diminished proportional to the increase of current reversals. It will be seen that by starting the work circuits with a light load when the speed is above the "limit" referred to, and decreasing the speed as the work increases to the said "limit" that constant potential will be practically maintained, or, by starting the work circuit with a light load when the speed is below the said "limit" and then increasing the speed as the work increases until the limit of speed is reached that constant potential may also be practically maintained in this way. Now, since the speed of a motor can be governed by the magnetic strength of its field magnets—the speed being inversely proportional to the strength of said magnetism—therefore, by either increasing or decreasing the amount of current flowing through its field coils, I can either cause the motor armature to run faster or slower. And again, since I can raise the pressure in the work circuit by either starting above or below the proper limit of speed, and varying the speed proportional to the work done, until this said "limit" is reached; therefore, by supplying the supplemental coils H' with a current which varies with the work done in the work circuit I can vary the speed of the motor armature and the converter inversely with either a rising or falling pressure in the induction circuit. This I accomplish by sending either the primary or secondary current of the converter through the supplemental field coils H'. If I want the motor to run slower as the work in the induction circuit increases, I send the current through the motor supplemental coils in such a direction that the motor field magnetism shall become increased by the current, and if I want the motor to run faster as the induction work increases, I then send the current through said coils in such a direction as to decrease the motor magnetism. This latter, which is a differential direction of current in the two coils H and H', I have indicated by reverse directions of arrow heads in H and H', shown in Fig. 1. The coil H', it will be understood, may have the current sent through it in either direction, so as to be either supplemental or differential in effect. Winding a motor with suplemental coils in this way, virtually compounds the motor so as to vary its speed as automatically with the work done in the work circuits as a compound wound dynamo will vary its voltage so as to agree with the total output of the machine.

The essential and novel features then, in this invention are:—First. Supplying two work circuits—one with an alternating and the other with a continuous current from the same converter, when constructed as aforesaid. Second. Winding the field cores of the motor with supplemental coils H', for the purpose of varying the speed of the converter either inversely or proportional to the work done in the work circuit.

What I claim as my invention is—

1. In a system of electrical distribution and conversion, a converter and two work circuits, the converter being symmetrically wound with primary and secondary circuits, each terminating in separate commutators, the primary circuit being supplied with rectified currents from a main line generator, and the secondary circuit supplying two work circuits, one with alternating and the other with rectified currents, substantially as described.

2. In a system of electrical distribution and conversion, the combination of an electric motor and a converter, the converter having two conductors which terminate respectively in separate commutators, the motor field magnets being wound with supplemental coils connected in electrical circuit with one of the converter commutators, substantially as described.

3. In a system of electrical distribution and conversion, the combination of a motor, a converter, a main continuous current supply station, a sub-station and an external work-circuit; the motor armature and the converter mechanically joined and rotatable together; the work-circuit supplied with a converted current; the motor field-magnets wound with supplemental coils, a continuous current flowing through said coils in a direction suitable for decreasing the motor field magnetism, said current being governed by the work done in the work-circuit; the main station supplying the sub-station with continuous current and the sub-station supplying the work-circuit with a converted current of lower potential than the main supply current, substantially as described.

In testimony whereof I sign this specification in the presence of two witnesses.

THOMAS H. HICKS.

Witnesses:
N. S. WRIGHT,
JOHN F. MILLER.